US012691994B1

(12) United States Patent
Merems

(10) Patent No.: US 12,691,994 B1
(45) Date of Patent: Jul. 28, 2026

(54) ASYMMETRICAL WING SWEEP CONTROL ACTUATOR (AWSCA) FOR ROLL CONTROL OF A WINGED FLIGHT VEHICLE

(71) Applicant: Raytheon Company, Arlington, VA (US)

(72) Inventor: Paul A. Merems, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 19/287,415

(22) Filed: Jul. 31, 2025

(51) Int. Cl.
  *B64C 3/40* (2006.01)
  *G05D 1/49* (2024.01)
(52) U.S. Cl.
  CPC *B64C 3/40* (2013.01); *G05D 1/49* (2024.01)
(58) Field of Classification Search
  CPC .. B64C 3/40; B64C 3/546; B64C 3/56; B64C 5/14; F42B 10/14; F42B 10/64; B64U 30/12; B64U 20/50
  See application file for complete search history.

(56) References Cited

U.S. PATENT DOCUMENTS

| | | | | | |
|---|---|---|---|---|---|
| 5,035,378 | A | * | 7/1991 | Spanovich | B64C 3/40 74/105 |
| 5,671,899 | A | * | 9/1997 | Nicholas | B64U 30/16 244/3.28 |
| 12,202,600 | B1 | * | 1/2025 | Foskey | B64C 3/56 |
| 12,434,815 | B2 | * | 10/2025 | Harvey | B64U 20/50 |
| 2006/0118675 | A1 | * | 6/2006 | Tidwell | B64C 3/40 244/123.1 |

OTHER PUBLICATIONS

"For aircraft with variable-sweep wings, how unstable is it to have each wing in a different position?", Aviation Stack Exchange, Retrieved Online. URL: <https://aviation.stackexchange.com/questions/77069/for-aircraft-with-variable-sweep-wings-how-unstable-is-it-to-have-each-wing-in>, (Apr. 2020), 4 pgs.
Gao, Liang, et al., "Dynamic Analysis and Experiment of Multiple Variable Sweep Wings on a Tandem-Wing MAV", Drones 2023, 7, 552, (Aug. 26, 2023), 19 pgs.
Polhamus, Edward C., et al., "Research Related to Variable-Sweep Aircraft Development", Conference Paper. Meeting of the Air Force Historical Foundation, Hampton, VA, Retrieved Online. URL: <https://ntrs.nasa.gov/citations/19810016532>, (May 1, 1981), 41 pgs.
Tong, Lei, et al., "Multi-body Dynamic Modelling and Roll Control of Asymmetric Variable Sweep Morphing Aircrafts", 2013 10th IEEE International Conference on Control and Automation (ICCA) Hangzhou, China, Jun. 12-14, 2013, 1567-1572.

* cited by examiner

*Primary Examiner* — Joshua J Michener
*Assistant Examiner* — Colin Zohoori
(74) *Attorney, Agent, or Firm* — Schwegman Lundberg & Woessner, P.A.

(57) ABSTRACT

Asymmetric wing sweep control provides roll control for a winged flight vehicle in which a single Symmetric Wing Deployment Actuator (SWDA) including an actuator and a Common End Mount (CEM) implement symmetric wing sweep. The SWDA rigidly and mechanically links the wings of the winged flight vehicle to each other. An asymmetric wing sweep control actuator (AWSCA) rotates the SWDA about a SWDA pivot axis causing the wings to sweep forward and aft in opposition to superimpose a variable asymmetric wing sweep onto the symmetric wing sweep to induce a roll moment to the airframe. Symmetric wing sweep may be fixed or variable.

20 Claims, 9 Drawing Sheets

ASYMMETRICAL WING SWEEP CONTROL ACTUATOR (AWSCA) FOR ROLL CONTROL OF A WINGED FLIGHT VEHICLE

BACKGROUND

Field

This disclosure relates to the use of asymmetric wing sweep for roll control of a winged flight vehicle, and more particularly to an asymmetrical wing sweep control actuator (AWSCA) for use with a mechanically linked Symmetric Wing Deployment Actuator (SWDA) to provide roll control for a winged flight vehicle.

Description of the Related Art

The wings on a winged flight vehicle have a wing sweep, which is defined as the angle from a perpendicular wing position back from the wing root to the actual wing position. Wing sweep has the effect of delaying shock waves and accompanying aerodynamic drag rise caused by fluid compressibility near the speed of sound. Wing sweep is typically equal or "symmetric" for both wings. Low speed winged flight vehicles will have a wing sweep at or close to perpendicular to maximize lift. High speed winged flight vehicles travelling at or near supersonic speeds require more sweep. Some high speed winged flight vehicles allow for variable symmetric wing sweep to improve flight performance at low and near supersonic speeds.

Roll control in a winged flight vehicle is typically accomplished via actuation of additional control surfaces such as ailerons, spoilers or elevons mounted on the wings. In certain flight vehicles such as missiles or drones, the limited wing thickness makes the installation of these types of control surfaces and their corresponding, linkages, mechanisms and actuators more challenging.

Asymmetric wing sweep entails superimposing an equal but opposite rotation of the wings upon the symmetric wing sweep, e.g, 35°+/−5°. The asymmetric wing sweep creates an imbalance between the left and right roll moments on the wings to induce a net roll moment. The amount of asymmetry provides roll control. This allows for the elimination of other control surfaces such as ailerons, spoilers and evolons. See Lei Tong and Haibo Ji, "Multi-Body Dynamic Modelling and Roll Control of Assymetric Variable Sweep Morphing Aircrafts" IEEE International Conference on Control and Automation (ICCA) Hangzhou, China, pp. 1567-1572 Jun. 12-14, 2013.

Referring now to FIGS. 1A-1B, a winged flight vehicle 100 includes a pair of wings 102 that are rotationally coupled to an airframe 104. The wings 102 are stowed within airframe 104 (or possibly against the airframe) and the winged flight vehicle 100 stored typically in a canister. At the launch, the pair of wings 102 rotate away from the airframe 104 to a symmetric wing sweep φ for flight.

As shown in FIGS. 2A-2B and 3A-3B, a pair of wing pivots 106 are mounted on airframe 104 to either side of a primary axis 108 that extends lengthwise along the airframe 104. Wing pivots 106 are preferably at equal distances to primary axis 108 to simplify control. Primary axis 108 may be a central axis of the airframe or may lie above or below the central axis. Wing mounts 110 are formed in one end of each wing and coupled to the wing pivots 106, respectively. A pair of push rods 112 are coupled to the respective wing mounts 110 at positions offset from a wing pivot axis 114 of the wing pivots 106 to create moment arms 116 to rotate the wings.

As shown in FIGS. 2A-2B, the winged flight vehicle includes a single Symmetric Wing Deployment Actuator (SWDA) 200 that is rigidly mounted to airframe 104. SWDA 200 includes an actuator 201 and a Common End Mount (CEM) 202 that is connected to the other end of the pair of push rods 112. In response to a wing deployment command issued by a flight controller 204, actuator 201 drives CEM 202 along primary axis 108 to a fully extended position to displace both of the pair of push rods 112, which in turn act on the moment arms 116 to rotate the pair of wings 102 from their deployed position to the symmetric wing sweep. The actuator 201 may, for example, be configured as a 1-shot actuator that uses a piston cylinder that driven by a gas cartridge or a variable actuator that uses a motor to drive a lead screw. The wings 102 are rigidly and mechanically linked to each other through the single SWDA 200.

As shown in FIGS. 3A-3B, the winged flight vehicle includes a pair of actuators 210 directly connected to the other end of the pair of push rods 112, respectively, to independently drive each push rod. In response to wing deployment commands issued by a flight controller 212, each actuator 210 drives its push rod 112, which acts through its moment arm 116 to rotate the corresponding wing 102 from its deployed position to the symmetric wing sweep. The actuator may, for example, be configured as a servo motor.

Liang Gao et. al., "Dynamic Analysis and Experiment of Multiple Variable Sweep Wings on a Tandem-Wing MAV", Drones 2023, 7, 552, pp 1-19, discloses variable symmetric wing sweep for pitch control and asymmetric wing sweep for roll control. To implement both variable symmetric wing sweep and asymmetric wing sweep for the drone, Gao uses independent servo controlled motors similar to the configuration shown in FIGS. 3A-3B herein.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure allows for asymmetric wing sweep control to provide roll control for a winged flight vehicle in which a single symmetric wind deployment actuator (WDA) implements symmetric wing sweep and rigidly and mechanically links the wings of the winged flight vehicle.

A winged flight vehicle includes an airframe having a primary axis that extends lengthwise along the airframe. First and second wing pivots are mounted on the airframe on opposite sides of the primary axis and oriented along first and second wing pivot axes. A first wing including a first wing mount is rotationally coupled to the first wing pivot. A second wing including a second wing mount is rotationally coupled to the second wing pivot.

A wing deployment actuator (WDA) includes a pair of push rods, a symmetric WDA (SWDA) and an asymmetric wing sweep control actuator (AWSCA). One end of the first push rod is coupled to the first wing mount and offset from the first wing pivot axis to form a first moment arm. One end of the second push rod coupled to the second wing mount and offset from the second wing pivot axis to form a second moment arm.

The SWDA includes an actuator and a common end mount (CEM) coupled to the other end of both push rods. The actuator is responsive to a wing deployment command to drive the CEM along the primary axis to an extended position to displace the first and second push rods, which in turn act on the first and second moment arms to rotate the first and second wings to a symmetric wing sweep. The first and second wings are rigidly and mechanically linked to each other through the SWDA.

The AWSCA includes a pivot mount and an actuator. The pivot mount supports the SWDA and is configured to rotate about a SWDA pivot axis that lies on the primary axis of the airframe, typically with a range of travel of the CEM along the primary axis of the airframe. The SWDA pivot axis and wing pivot axes are perpendicular to a plane that includes the first and second wing pivots and the primary axis. The actuator is responsive to a roll control command to rotate the pivot mount and SWDA about the SWDA pivot axis to drive the first and second push rods in opposite directions relative to the primary axis of the airframe causing one of said first and second wings to sweep forward and the other of said first and second wings to sweep aft to superimpose an asymmetric wing sweep onto the symmetric wing sweep to induce a roll moment to the airframe.

In an embodiment, the SWDA pivot axis lies at a fully extended position of the CEM at the end of the range of travel. In this location, the WDA pivot axis lies at the middle of a line that extends between the centers of the first and second wing mounts as the SWDA rotates about the SWDA pivot axis. Allowing for alignment tolerances, the first and second wings are swept forward and aft by equal but opposite degrees of rotation. Because the wings rotate in equal and opposite directions, the wings produce moments on the SWDA and CEM that negate each other. Since any displacement (e.g., alignment tolerances) of the SWDA pivot axis from the fully extended position of the CEM will induce some degree of imbalance in the wing sweep, a flight controller is responsive to a measured roll of the airframe to adjust the roll control command to produce a commanded roll moment. The SWDA actuator is suitably a 1-shot actuator that locks the symmetric wing sweep at the fully extended position of the CEM, which cannot be changed.

In another embodiment, the SWDA actuator is responsive to the wing deployment command to vary the symmetric wing sweep about a nominal wing sweep. The SWDA pivot axis is positioned at a nominal extended position of the CEM corresponding to the nominal wing sweep. Displacement of the CEM from the nominal extended position to vary the symmetric wing sweep impacts the asymmetric sweep control by causing the first and second wings to sweep forward and aft by different degrees of rotation. This causes the induced roll moment to differ from a commanded roll moment. A flight controller responsive to a measured roll of the airframe adjusts the roll control command to produce the commanded roll moment. Alternately, a look up table (LUT) can be provided to adjust the roll control command as a function of the symmetric wing sweep.

These and other features and advantages of the disclosure will be apparent to those skilled in the art from the following detailed description of preferred embodiments, taken together with the accompanying drawings, in which:

DETAILED DESCRIPTION

Figure 1B:
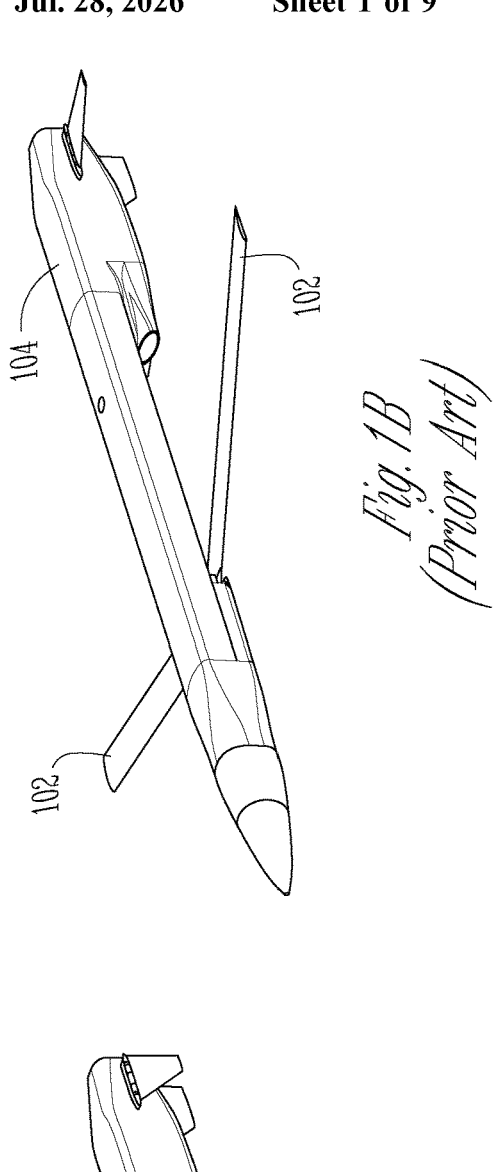
FIGS. 1A-1B, as discussed above, illustrate a winged flight vehicle with its wings stowed and deployed to a symmetric wing sweep.
Figure 1A:
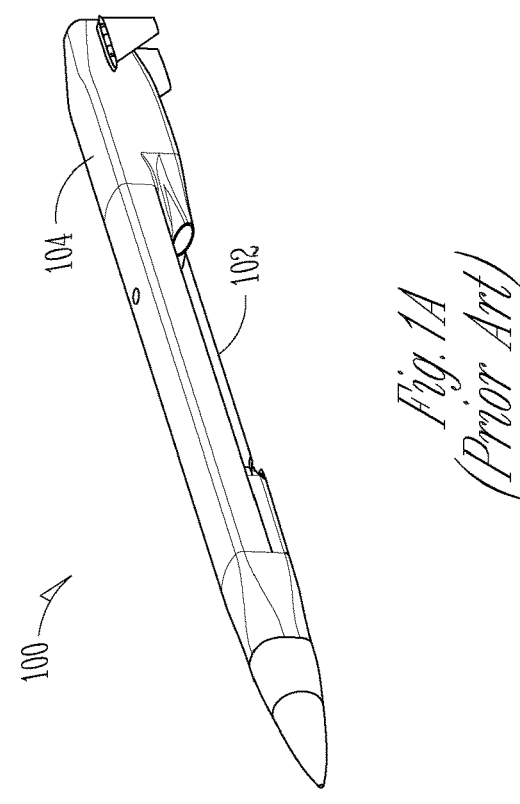
Figures 2A, 2B:
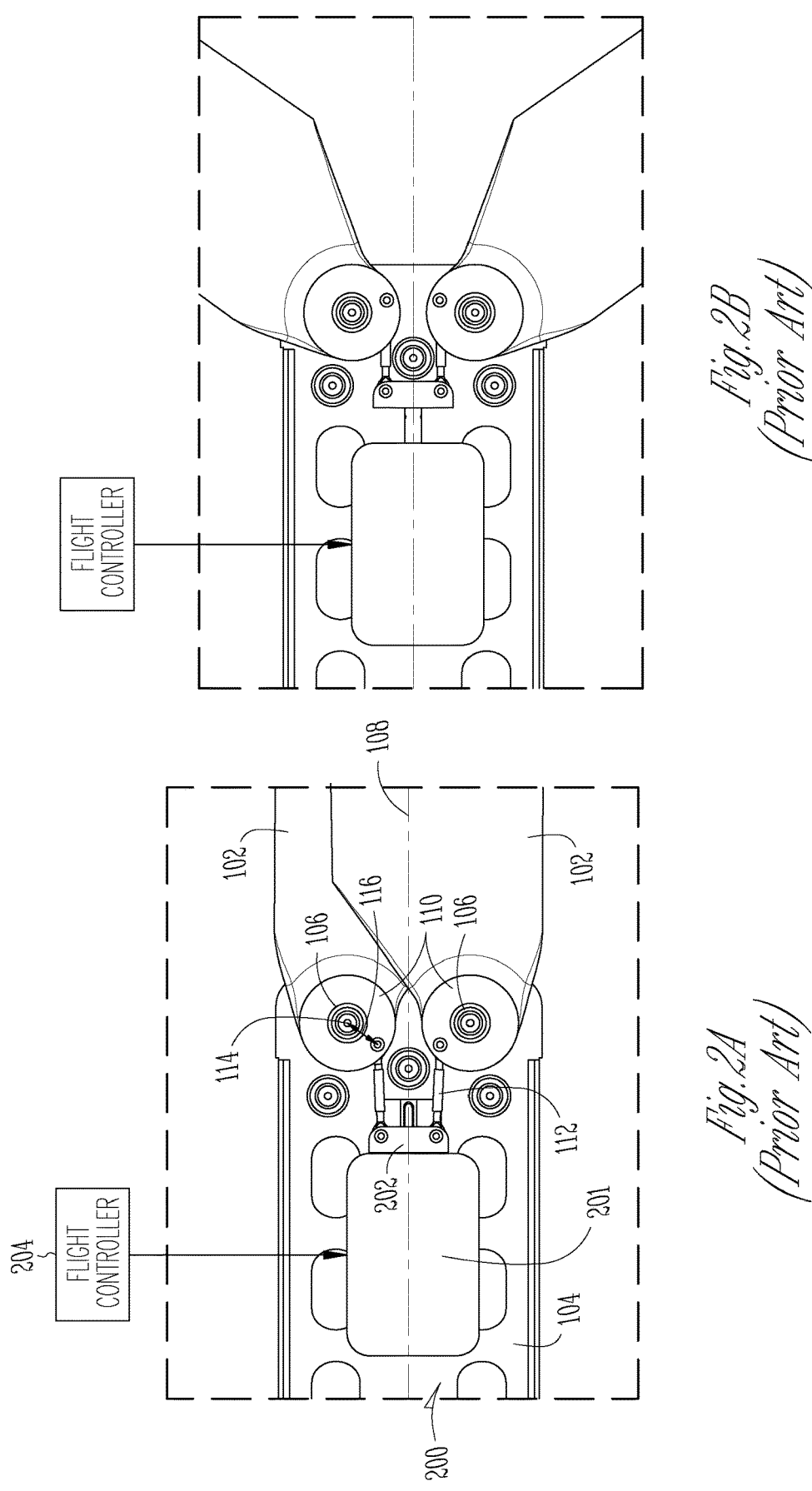
FIGS. 2A-2B, as discussed above, illustrate an embodiment of a single SWDA to drive the pair of wings to the symmetric wing sweep.
Figure 3B:
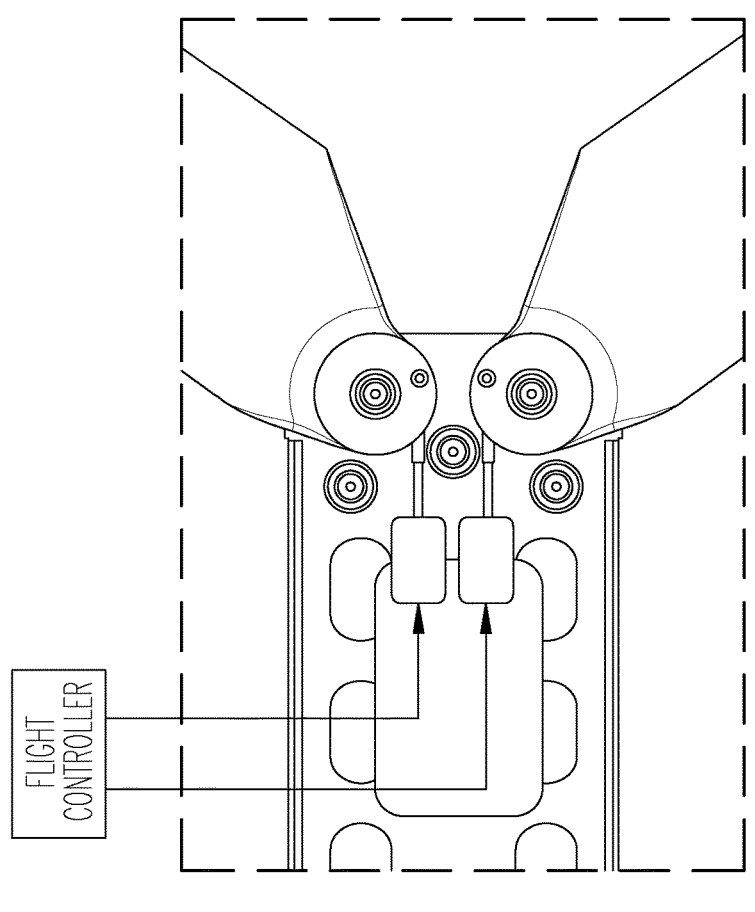
FIGS. 3A-3B, as discussed above, illustrate an embodiment of a pair of actuators to independently drive each wing to its symmetric wing sweep.
Figure 3A:
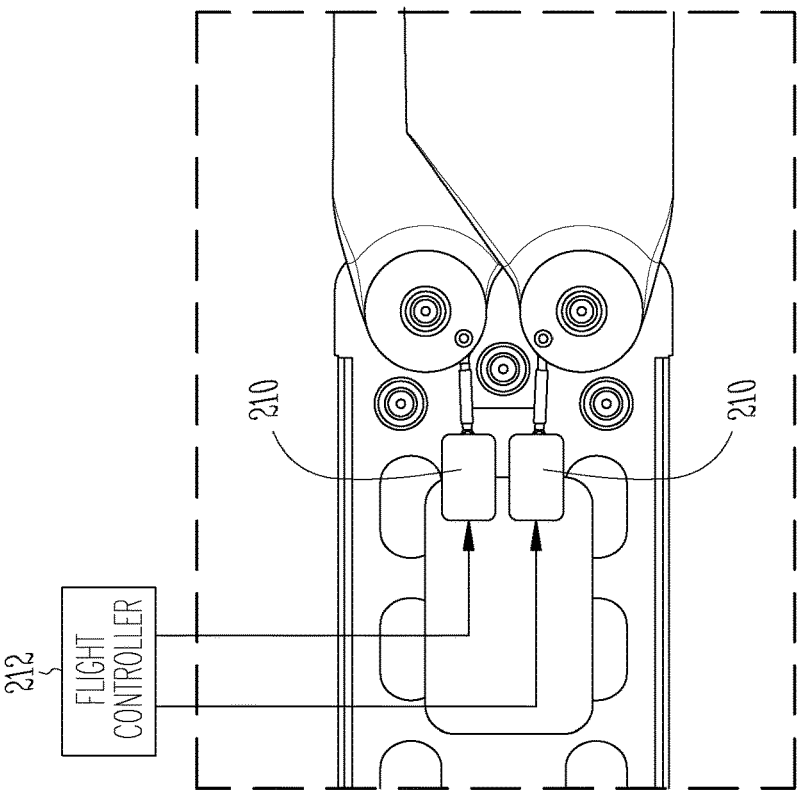
Figures 4A, 4B:
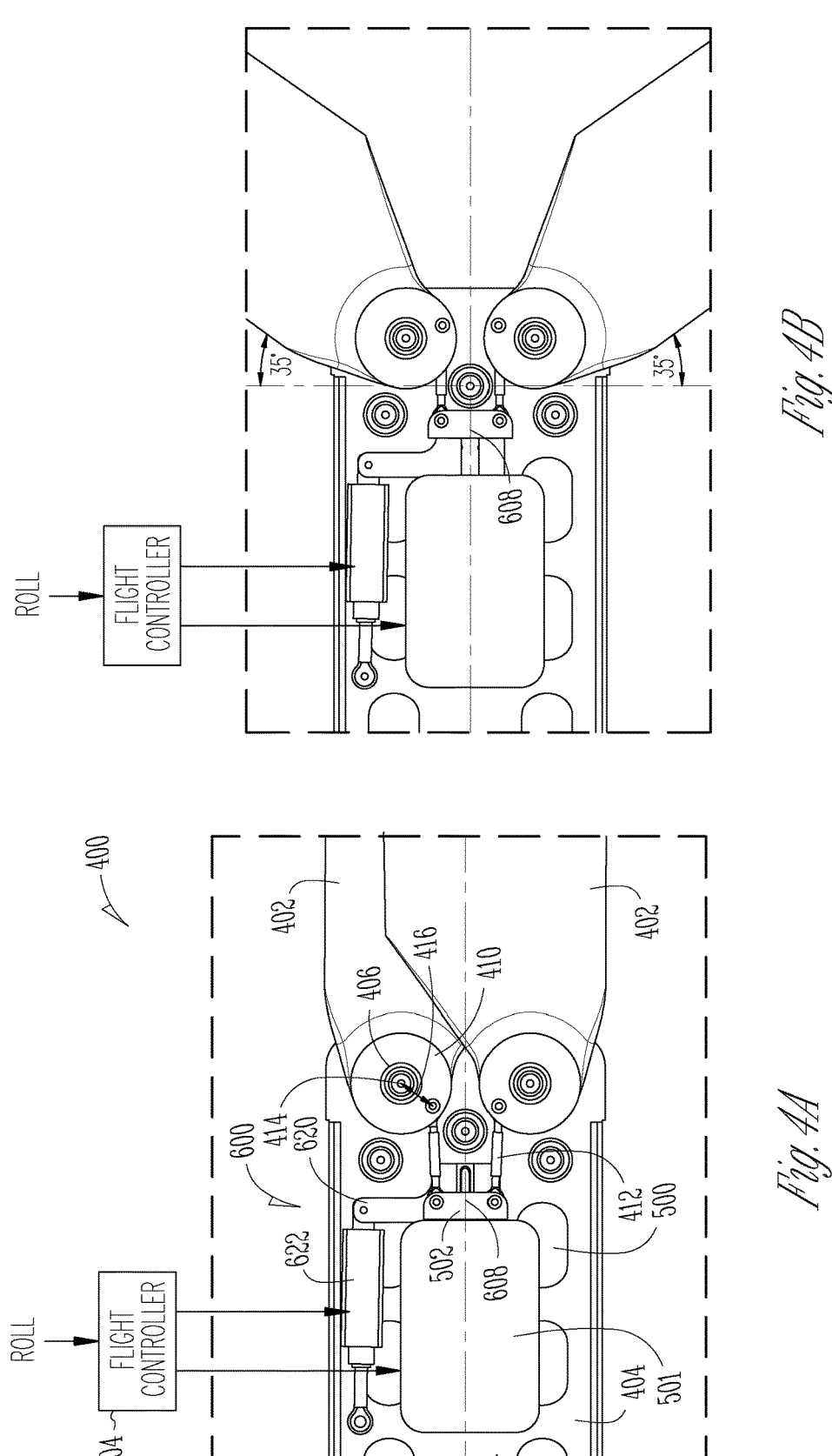
FIGS. 4A-4B illustrate an embodiment of an asymmetrical wing sweep control actuator (AWSCA) for use with a single SWDA in wings stowed and wing deployed positions.
Figures 5A, 5B:
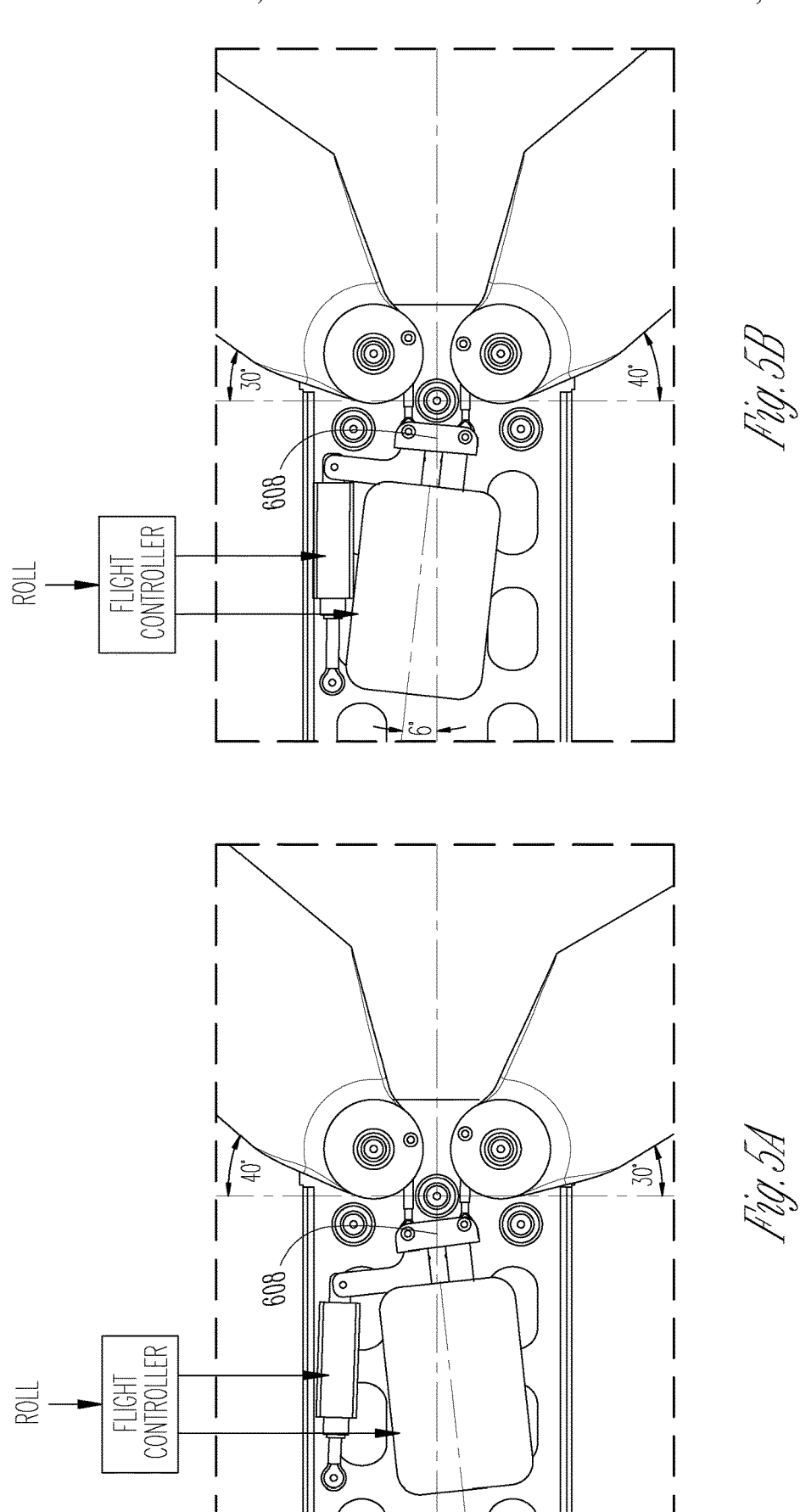
FIGS. 5A-5B illustrate the use of the AWSCA with the single SWDA to superimpose different asymmetric wing sweep onto the symmetric wing sweep.
Figure 6:
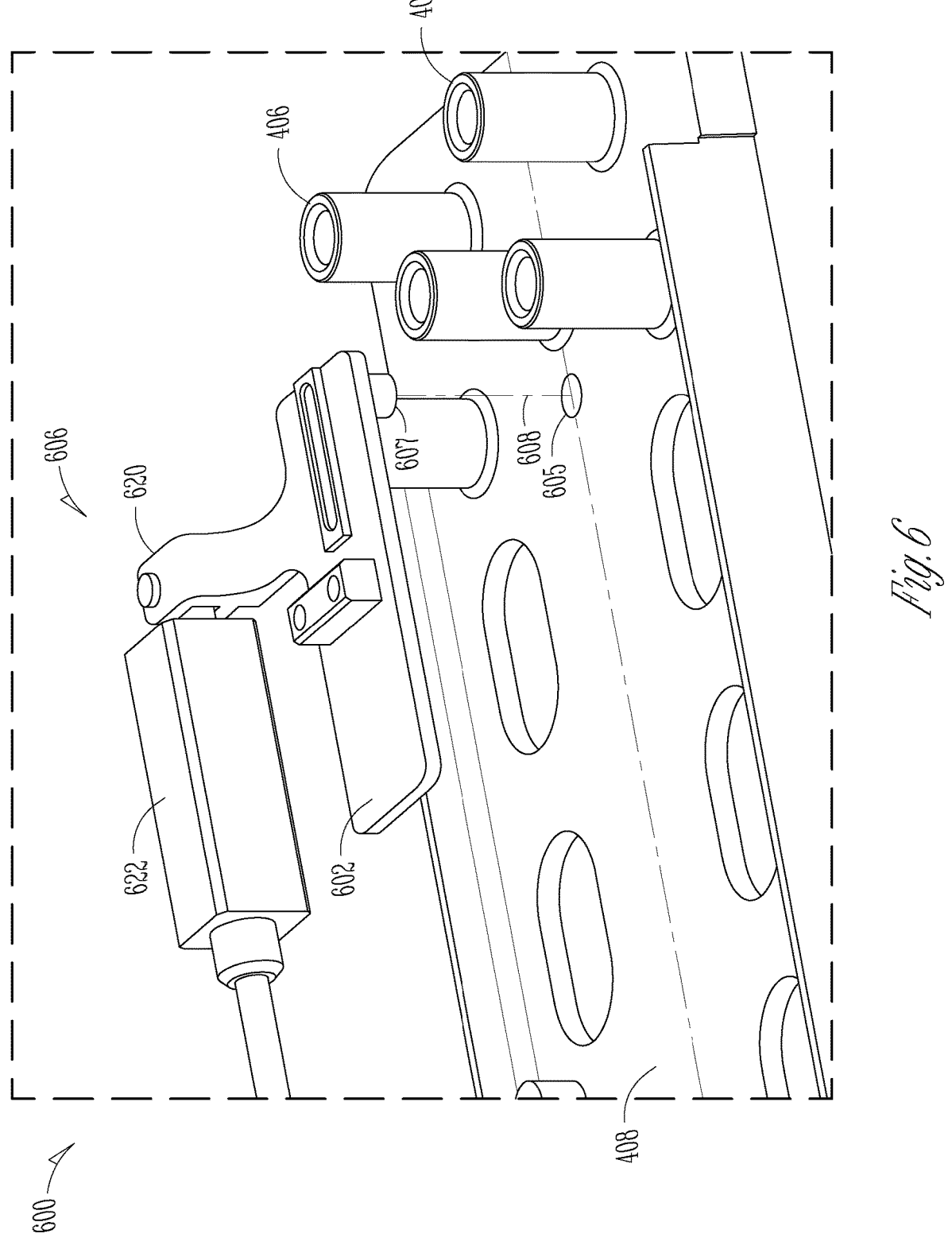
FIG. 6 is an exploded view of an embodiment of the AWSCA.
Figure 7A:
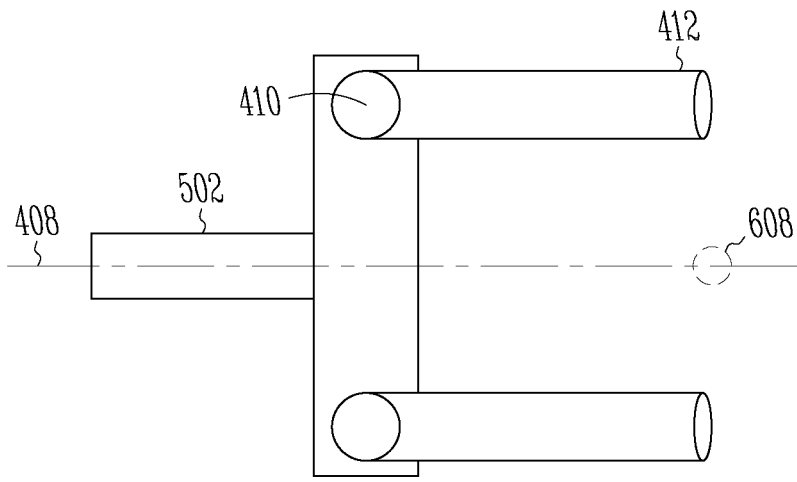
FIGS. 7A-7C illustrate the linear actuation of the CEM to its fully deployed position in which the AWSCA's pivot axis lies at the center of the CEM at the fully deployed position and at the middle of the line between the spherical centers of the ends of the push rods and then rotation of the SWDA about the pivot axis to superimpose the asymmetric wing sweep.
Figure 7B:
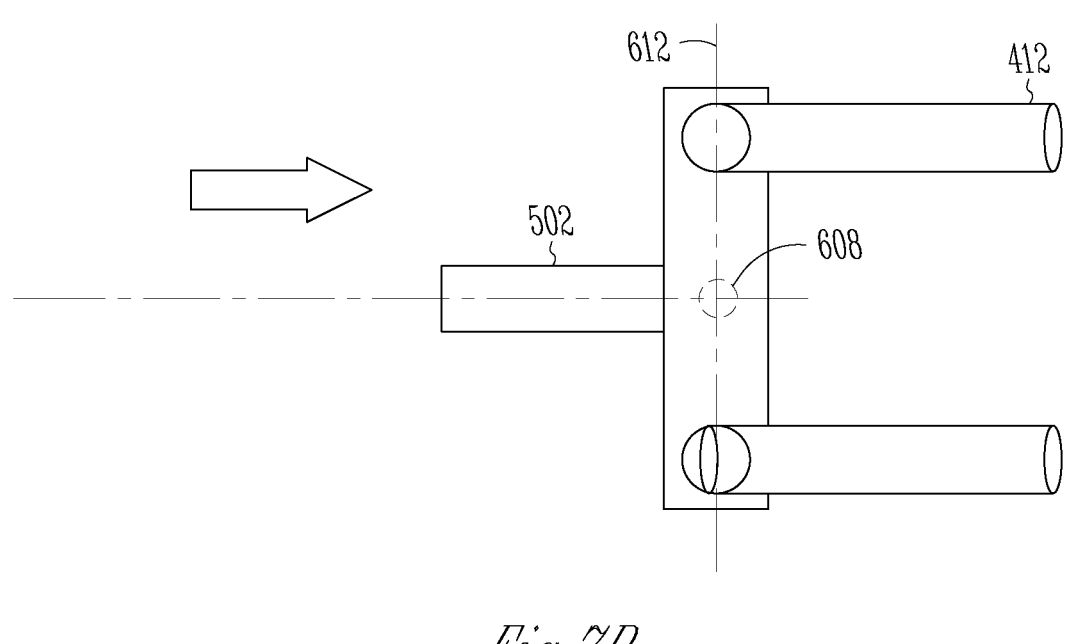
Figure 7C:
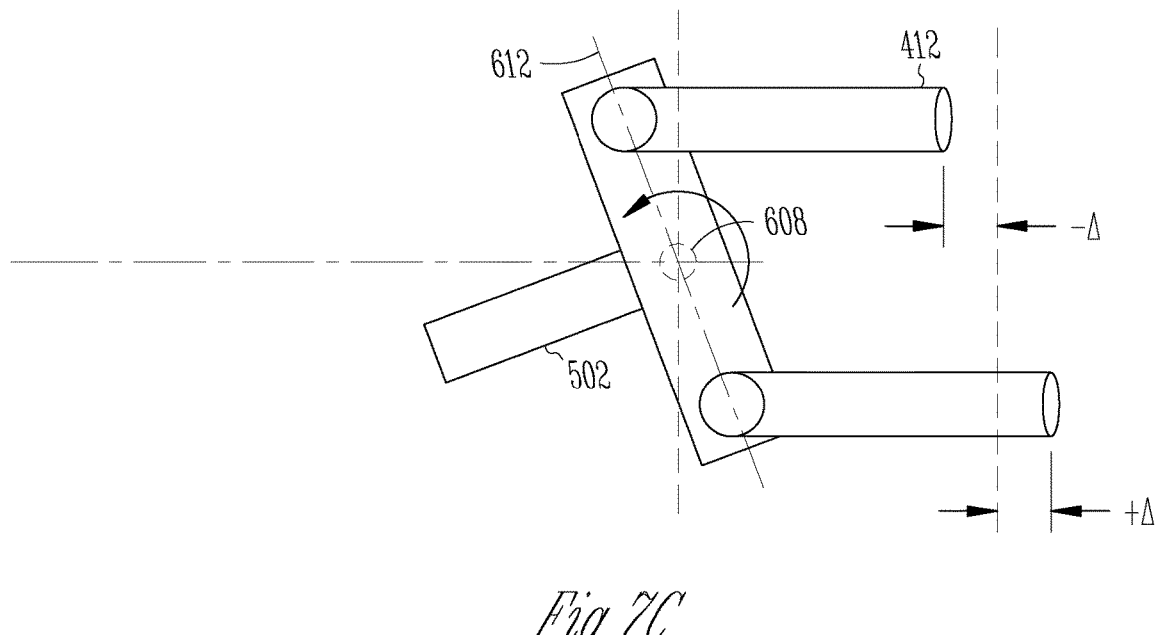

The present disclosure allows for asymmetric wing sweep control to provide roll control for a winged flight vehicle in which a single SWDA including an actuator and a CEM implement symmetric wing sweep and rigidly and mechanically link the wings of the winged flight vehicle. An asymmetric wing sweep control actuator (AWSCA) rotates the SWDA about a SWDA pivot axis causing the wings to sweep forward and aft in opposition to superimpose a variable asymmetric wing sweep onto the symmetric wing sweep to induce a roll moment to the airframe.

Referring now to FIGS. 4A-4B, 5A-5B, 6 and 7A-7C, an embodiment of a winged flight vehicle 400 is configured to deploy first and second wings 402 from a stowed position within or against an airframe 404 to a deployed position having a symmetric wing sweep φ e.g., 35° that is fixed and to superimpose a variable asymmetric wing sweep e.g., +/−5° onto the fixed symmetric wing sweep in varying degrees to implement roll control.

A pair of wing pivots 406 are mounted on airframe 404 to either side of a primary axis 408 that extends lengthwise along the airframe 404. Wing pivots 406 are preferably at equal distances to primary axis 408 to simplify control. Primary axis 408 may be a central axis of the airframe or may lie above or below the central axis. Wing mounts 410 are formed in one end of each wing and coupled to the wing pivots 406, respectively. A pair of push rods 412 are coupled to the respective wing mounts 410 at positions offset from a wing pivot axis 414 of the wing pivots 406 to create moment arms 416 to rotate the wings.

The winged flight vehicle includes a single Symmetric Wing Deployment Actuator (SWDA) 500 that is rigidly mounted to airframe 404. SWDA 500 includes an actuator 501 and a Common End Mount (CEM) 502 connected to the other end of the pair of push rods 412. In response to a wing deployment command issued by a flight controller 504, actuator 501 drives CEM 502 along primary axis 408 to a fully extended position to displace both of the pair of push rods 412, which in turn act on the moment arms 416 to rotate the pair of wings 402 from their deployed position to the symmetric wing sweep of φ=35°. The actuator 501 may, for example, be configured as a 1-shot actuator that uses a piston cylinder that is driven by a gas cartridge or a variable actuator that uses a motor to drive a lead screw. The wings 402 are rigidly and mechanically linked to each other through the single SWDA 500.

An Asymmetric Wing Sweep Control Actuator (AWSCA) 600 includes a pivot mount 602 on airframe 404 and an actuator 606. Pivot mount 602 may, for example, include a hole 605 in the airframe and a post 607 on actuator 606 or vice-versa. Pivot mount 602 supports SWDA 500 and is configured to rotate about a SWDA pivot axis 608 that lies on the primary axis 408 of the airframe 404. In this example actuator 606 includes a pivot arm 620 that is coupled to the pivot mount 602 and a linear actuator 622 that drives the other end of the pivot arm 620 to rotate the pivot mount. 602. Alternately, actuator 606 could be a rotational or rotary actuator.

The SWDA pivot axis 608 and wing pivot axes are perpendicular to a plane that includes the first and second wing pivots 406 and the primary axis 408. The SWDA pivot axis 608 typically lies within a range of travel of the CEM 502 along the primary axis 408 of the airframe. The actuator 606 is responsive to a roll control command from flight controller 504 to rotate the pivot mount 602 and SWDA 500 about the SWDA pivot axis 608 to drive the first and second push rods 412 in opposite directions relative to the primary axis 408 causing one of said first and second wings 402 to sweep forward and the other of said first and second wings to sweep aft to superimpose an asymmetric wing sweep 610 e.g., +/−5° onto the fixed symmetric wing sweep e.g., φ=35° to induce a roll moment to the airframe 404.

In this embodiment, in which the CEM 502 is driven to its fully extended position to rotate the wings 402 to the fixed symmetric wing sweep e.g., φ=35°, the SWDA pivot axis lies 608 at a fully extended position of the CEM at the end of the range of travel. In this location, the WDA pivot axis lies 608 at the middle of a line 612 that extends between the centers of the first and second wing mounts 410 as the SWDA 500 rotates about the SWDA pivot axis 608. Allowing for alignment tolerances, the first and second push rods 412 are displaced by +/−Δ and the wings are swept forward and aft by equal but opposite degrees of rotation symmetric wing sweep e.g., +5° and −5°. Because the wings rotate in equal and opposite directions, the wings produce moments on the SWDA 500 and CEM 502 that negate each other. Since any displacement of the SWDA pivot axis 608 from the fully extended position of the CEM 502 will induce some degree of imbalance in the asymmetric wing sweep, flight controller 504 is responsive to a measured roll of the airframe 404 to adjust the roll control command to produce a commanded roll moment. The SWDA actuator is suitably a 1-shot actuator that locks the symmetric wing sweep at the fully extended position of the CEM, which cannot be changed.

Figure 8:
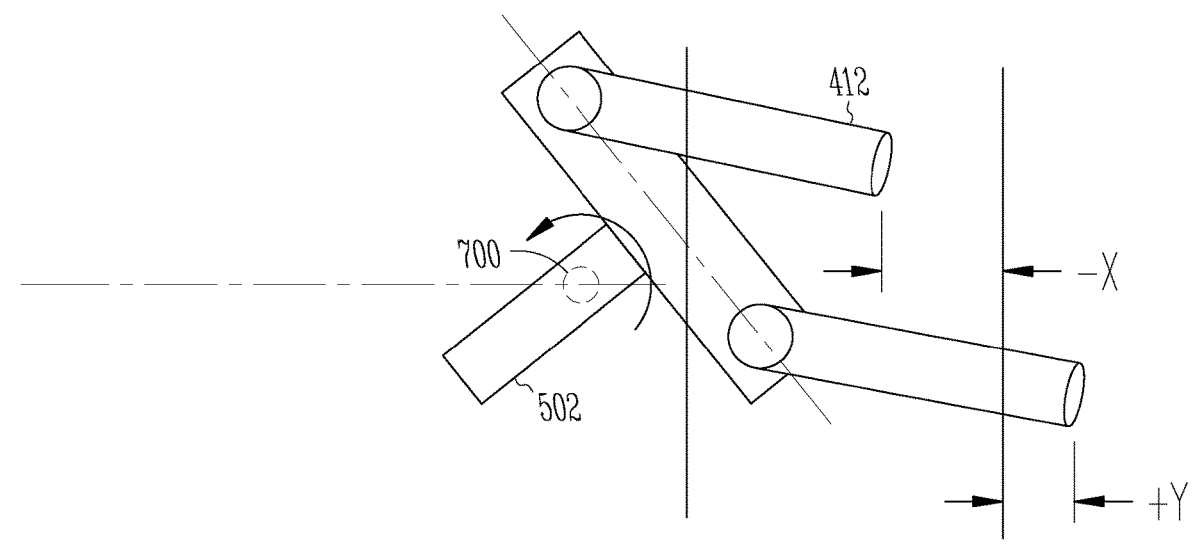
FIG. 8 illustrates the linear actuation of the CEM to its fully deployed position in which the AWSCA's pivot axis lies at a nominal position in the range of travel of the CEM and is offset from the middle of the line between the spherical centers of the ends of the push rods with rotation of the SWDA about the pivot axis to superimpose the asymmetric wing sweep.

Referring now to FIG. 8, in another embodiment, the SWDA actuator is responsive to the wing deployment command to vary the symmetric wing sweep about a nominal wing sweep e.g., φ=35°+/−5°. The SWDA pivot axis 700 is positioned at a nominal extended position of the CEM 502 corresponding to the nominal wing sweep. Displacement of the CEM 502 from the nominal extended position to vary the symmetric wing sweep impacts the asymmetric sweep control by causing the push rods 412 to be displaced by different amounts X and Y and first and second wings 402 to sweep forward and aft by different degrees of rotation e.g. −3° and +2°. This causes the induced roll moment to differ from a commanded roll moment. The flight controller responds to a measured roll of the airframe to adjust the roll control command to produce the commanded roll moment. Alternately, a look up table (LUT) could compensate the roll control command as a function of the symmetric wing sweep.

Figure 9:
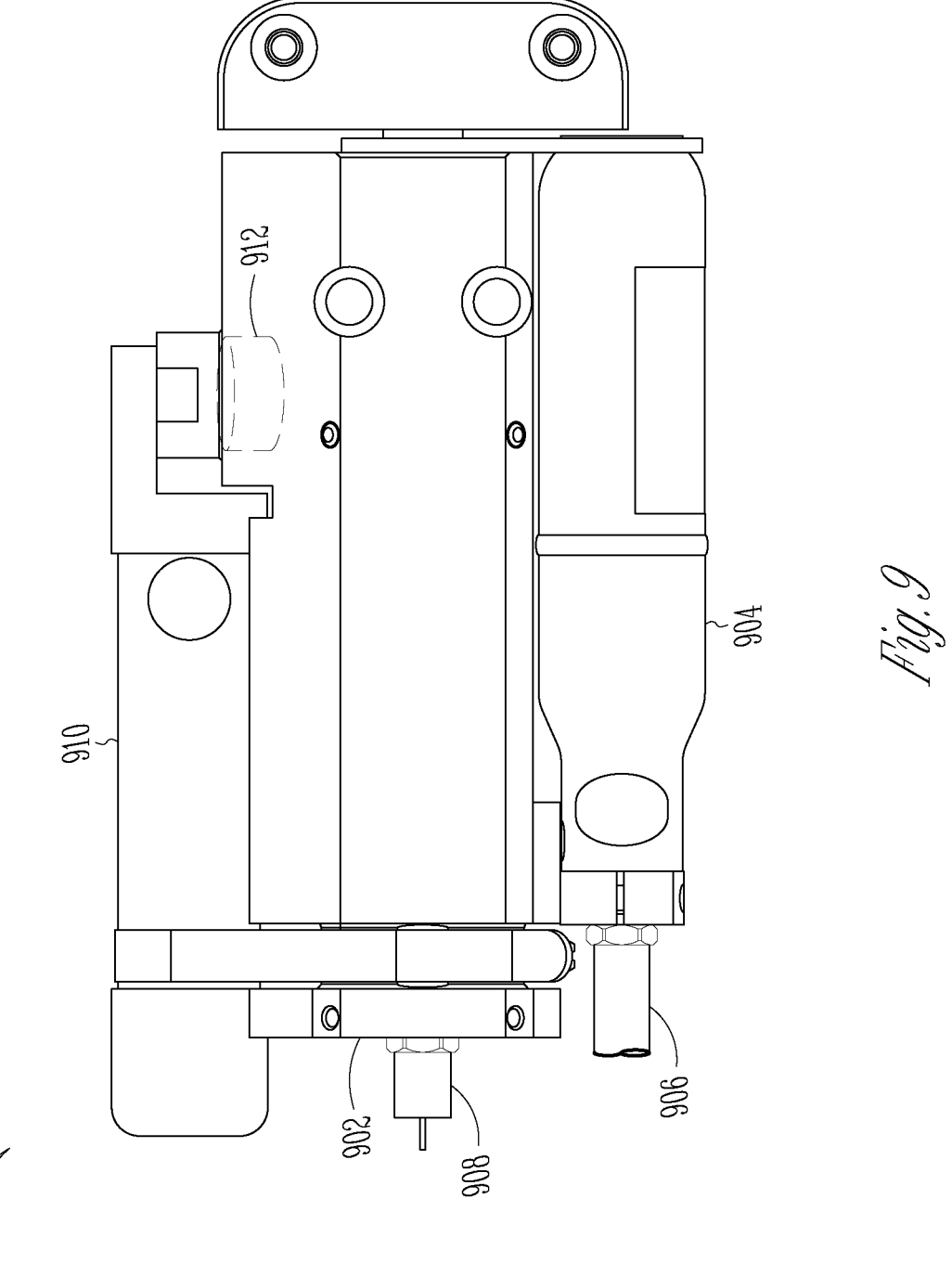
FIG. 9 illustrates an embodiment of a 1-shot actuator for the SWDA.

Referring now to FIG. 9, an embodiment of a 1-shot actuator 900 includes a piston cylinder 902 which is driven by a gas cartridge 904. The gas from the gas cartridge is released using a electrically initiated "squibbed" valve 906. The piston is locked in the retracted position for wing stowage and is unlocked using a electrically initiated "squibbed" release 908. Both the gas cartridge and piston lock squibs are simultaneously activated. The low-pressure side of the piston is filled with hydraulic fluid and there is an empty hydraulic reservoir 910 which receives the fluid once the piston moves forward in the cylinder. There is a burst disc 912 and orifice that separates the low-pressure side of the piston and the hydraulic reservoir. Once there is enough pressure on the piston and therefore on the hydraulic fluid, it causes the burst disc to rupture allowing the fluid to transfer to the reservoir. The orifice controls the rate the piston moves. Once the piston reaches the end of stroke, locking fingers on the piston expand into groves in the cylinder locking the piston in the final position.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A winged flight vehicle, comprising:

an airframe having a primary axis that extends lengthwise along the airframe;

first and second wing pivots mounted on the airframe on opposite sides of the primary axis and oriented along first and second wing pivot axes;

first and second wings, said first wing including a first wing mount rotationally coupled to the first wing pivot and said second wing including a second wing mount rotationally coupled to the second wing pivot;

first and second push rods, one end of the first push rod coupled to the first wing mount and offset from the first wing pivot axis to form a first moment arm, one end of the second push rod coupled to the second wing mount and offset from the second wing pivot axis to form a second moment arm;

a symmetric wing deployment actuator (SWDA) including a first actuator and a common end mount (CEM) coupled to the other end of both push rods, said first actuator responsive to a wing deployment command to drive the CEM along the primary axis to an extended position to displace the first and second push rods, which act on the first and second moment arms to rotate the first and second wings to a symmetric wing sweep, wherein the first and second wings are rigidly and mechanically linked to each other through the SWDA; and an asymmetric wing sweep control actuator (AWSCA) including a pivot mount that supports the SWDA and is config-
ured to rotate about a SWDA pivot axis that lies on
the primary axis of the airframe; and a second actuator responsive to a roll control command
to rotate the pivot mount and SWDA about the
SWDA pivot axis to drive the first and second push
rods in opposite directions relative to the primary
axis of the airframe causing one of said first and
second wings to sweep forward and the other of said
first and second wings to sweep aft to superimpose
an asymmetric wing sweep onto the symmetric wing
sweep to induce a roll moment to the airframe.

2. The winged flight vehicle of claim 1, wherein the first
and second wing pivot axes and the SWDA pivot axis are
perpendicular to a plane that includes the first and second
wing pivots and the primary axis.

3. The winged flight vehicle of claim 1, wherein the
SWDA pivot axis lies within a range of travel of the CEM
along the primary axis.

4. The winged flight vehicle of claim 3, wherein the
SWDA pivot axis lies at a fully extended position of the
CEM at the end of the range of travel, said WDA pivot axis
lying at the middle of a line that extends between the centers
of the first and second wing mounts as the SWDA rotates
about the SWDA pivot axis.

5. The winged flight vehicle of claim 4, wherein the
SWDA locks the CEM in place at the fully extended
position.

6. The winged flight vehicle of claim 5, wherein the first
actuator is a 1-shot actuator whereby the first and second
wings are locked into the symmetric wing sweep at the fully
extended position of the CEM and cannot be changed.

7. The winged flight vehicle of claim 4, wherein the first
and second wings sweep forward and aft by equal but
opposite degrees of rotation.

8. The winged flight vehicle of claim 4, wherein the first
and second wings rotate in opposite directions to impose the
asymmetric wing sweep producing moments on the SWDA
and CEM that negate each other.

9. The winged flight vehicle of claim 4, wherein any
displacement of the SWDA pivot axis from the fully
extended position of the CEM causes the induced roll
moment to differ from a commanded roll moment, further
comprising a flight controller responsive to a measured roll of the
airframe to adjust the roll control command to produce
the commanded roll moment.

10. The winged flight vehicle of claim 3, wherein the
SWDA pivot axis lies at a nominal extended position of the
CEM within the range of travel, wherein the SWDA is
responsive to the wing deployment command to displace the
CEM from the nominal extended position to vary the
symmetric wing sweep.

11. The winged flight vehicle of claim 10, wherein dis-
placement of the CEM from the nominal extended position
causes the first and second wings to sweep forward and aft
by different degrees of rotation such that the induced roll
moment differs from a commanded roll moment, further
comprising:

a flight controller responsive to a measured roll of the
airframe to adjust the roll control command to produce
the commanded roll moment.

12. The winged flight vehicle of claim 10, wherein the
second actuator includes a pivot arm that is coupled to the
pivot mount and a linear actuator that drives the other end of
the pivot arm to rotate the pivot mount.

13. The winged flight vehicle of claim 12, wherein the
first and second wings rotate in opposite directions to impose the asymmetric wing sweep produc-
ing moments on the SWDA and CEM that negate each
other.

14. The winged flight vehicle of claim 12, further com-
prising:

a flight controller responsive to a measured roll of the
airframe to adjust the roll command signal to produce
a desired roll moment.

15. A winged flight vehicle, comprising:

an airframe having a primary axis that extends lengthwise
along the airframe;

first and second wing pivots mounted on the airframe on
opposite sides of the primary axis along first and
second wing pivot axes;

first and second wings, said first wing including a first
wing mount rotationally coupled to the first wing
pivot and said second wing including a second wing
mount rotationally coupled to the second wing pivot;

first and second push rods, one end of the first push rod
coupled to the first wing mount and offset from the
first wing pivot axis to form a first moment arm, one
end of the second push rod coupled to the second
wing mount and offset from the second wing pivot
axis to form a second moment arm;

a symmetric wing deployment actuator (SWDA)
including a 1-shot actuator and a common end mount
(CEM) coupled to the other end of both push rods,
said 1-shot actuator responsive to a wing deployment
command to drive the CEM along the primary axis
to a fully extended position to displace the first and
second push rods, which act on the first and second
moment arms to rotate the first and second wings to
a symmetric wing sweep that is locked and cannot be
changed, wherein the first and second wings are
rigidly and mechanically linked to each other
through the SWDA; and an asymmetric wing sweep control actuator (AWSCA)
including a pivot mount that supports the SWDA and is con-
figured to rotate about a SWDA pivot axis that lies
on the primary axis of the airframe at the fully
extended position of the CEM, said SWDA pivot
axis lying at the middle of a line that extends
between the centers of the first and second wing
mounts as the SWDA rotates about the SWDA
pivot axis; and an actuator responsive to a roll control command to
rotate the pivot mount and SWDA about the
SWDA pivot axis to drive the first and second
push rods in opposite directions relative to the axis
of the airframe causing one of said first and second
wings to sweep forward and the other of said first
and second wings to sweep aft by equal but
opposite degrees of rotation to superimpose an
asymmetric wing sweep onto the symmetric wing
sweep to induce a roll moment to the airframe.

16. A wing deployment actuator (WDA) for a winged
flight vehicle in which a pair of wings are rotationally
coupled via wing mounts to a pair of wing pivots mounted
on an airframe on opposite sides of a primary axis, said
WDA comprising:

a pair of push rods coupled to the wing mounts and offset
from rotational axes of the wing pivots to form a pair
of moment arms;

a symmetric wing deployment actuator (SWDA) includ-
ing a first actuator and a common end mount (CEM)
coupled to both push rods, said actuator configured to
drive the CEM along the primary axis to displace the
pair of push rods, which act on the pair of moment arms
to rotate the pair of wings to a symmetric wing sweep,
wherein the pair of wings are rigidly and mechanically
linked to each other through the SWDA; and an asymmetric wing sweep control actuator (AWSCA)
including a pivot mount that supports the SWDA and is config-
ured to rotate about a SWDA pivot axis that lies on
the primary axis; and a second actuator responsive to a roll control signal to
rotate the pivot mount and SWDA about the SWDA
pivot axis to differentially change a relationship
between the wing pivots/moment arms and the CEM
causing one of wings to sweep forward and the other
wing to sweep aft to superimpose an asymmetric
wing sweep onto the symmetric wing sweep to
induce a roll moment to the airframe.

17. The WDA of claim 16, wherein the SWDA pivot axis
lies at a fully extended position of the CEM, said WDA pivot
axis lying at the middle of a line that extends between the
centers of the first and second wing mounts as the SWDA
rotates about the SWDA pivot axis.

18. The WDA of claim 17, wherein any displacement of
the SWDA pivot axis from the fully extended position of the
CEM causes the induced roll moment to differ from a
commanded roll moment, further comprising a flight controller responsive to a measured roll of the
airframe to adjust the roll control command to produce
the commanded roll moment.

19. The WDA of claim 17, wherein the first actuator is a
1-shot actuator whereby the first and second wings are
locked into the symmetric wing sweep at the fully extended
position of the CEM and cannot be changed.

20. The WDA of claim 16, wherein the SWDA pivot axis
lies at a nominal extended position of the CEM within the
range of travel, wherein the SWDA is responsive to the wing
deployment command to displace the CEM from the nomi-
nal extended position to vary the symmetric wing sweep
causing the first and second wings to sweep forward and aft
by different degrees of rotation such that the induced roll
moment differs from a commanded roll moment, further
comprising:

a flight controller responsive to a measured roll of the
airframe to adjust the roll control command to produce
the commanded roll moment.

* * * * *